United States Patent
Cunha et al.

(10) Patent No.: US 6,990,391 B1
(45) Date of Patent: Jan. 24, 2006

(54) METHOD AND APPARATUS TO CONTROL A BEVERAGE OR DESSERT DISPENSER

(75) Inventors: James P. Cunha, Westford, MA (US); Dennis J. Cohlmia, Wichita, KS (US); James A. Steinbacher, Watertown, CT (US); Joel D. Hockenbury, Arkansas City, KS (US)

(73) Assignee: Kan-Pak, L.L.C., Arkansas City, KS (US)

( * ) Notice: Subject to any disclaimer, the term of this patent is extended or adjusted under 35 U.S.C. 154(b) by 52 days.

(21) Appl. No.: 10/460,463

(22) Filed: Jun. 12, 2003

Related U.S. Application Data

(63) Continuation-in-part of application No. 10/261,846, filed on Sep. 30, 2002, now Pat. No. 6,705,106.

(51) Int. Cl.
*G06F 17/00* (2006.01)

(52) U.S. Cl. .................. 700/237; 700/231; 700/225; 222/52

(58) Field of Classification Search ........... 700/237, 700/225; 222/52
See application file for complete search history.

(56) References Cited

U.S. PATENT DOCUMENTS

| | | | |
|---|---|---|---|
| 3,528,587 A | 9/1970 | Popinski | 222/56 |
| 3,638,392 A | 2/1972 | Welker, Jr. et al. | 53/123 |
| 3,656,316 A | 4/1972 | Stock | 62/306 |
| 3,874,189 A | 4/1975 | Calim | 62/306 |
| 3,898,859 A | 8/1975 | Duke | 62/135 |
| 3,934,427 A | 1/1976 | Keyes | 62/342 |
| 4,201,558 A | 5/1980 | Schwitters et al. | 62/70 |
| 4,487,337 A | 12/1984 | DeJardins | 222/129 |
| 4,528,824 A | 7/1985 | Herbert | 62/331 |
| 4,538,427 A | 9/1985 | Cavalli | 62/342 |
| 4,544,084 A | 10/1985 | Cleland | 222/56 |
| 4,625,525 A | 12/1986 | Bradbury et al. | 62/330 |
| 4,728,005 A | 3/1988 | Jacobs et al. | 222/64 |
| 4,869,072 A | 9/1989 | Sexton et al. | 62/136 |
| 4,900,158 A | 2/1990 | Ugolini | 366/143 |
| 5,000,352 A | 3/1991 | Cleland | 222/129 |
| 5,348,753 A | 9/1994 | Ahnell et al. | 426/231 |
| 5,417,355 A | 5/1995 | Broussalian et al. | 222/146 |
| 5,419,150 A | 5/1995 | Kaiser et al. | 62/342 |
| 5,487,493 A | 1/1996 | McNabb | 222/153 |
| 5,588,558 A | 12/1996 | Cox et al. | 222/64 |
| 5,713,214 A | 2/1998 | Ugolini | 62/188 |
| 5,750,216 A * | 5/1998 | Horino et al. | 428/34.3 |
| 5,771,917 A | 6/1998 | Carney et al. | 137/238 |
| 5,799,832 A | 9/1998 | Mayo | 222/135 |
| 5,813,574 A | 9/1998 | McNabb | 222/146 |
| 5,842,603 A * | 12/1998 | Schroeder et al. | 222/23 |
| 5,906,105 A | 5/1999 | Ugolini | 62/136 |

(Continued)

FOREIGN PATENT DOCUMENTS

GB  2154204 A  9/1985

(Continued)

Primary Examiner—Khoi H. Tran
(74) Attorney, Agent, or Firm—Head, Johnson & Kachigian

(57) ABSTRACT

A liquid or semi-frozen liquid beverage or dispenser apparatus which includes a storage compartment for a bulk storage container and which includes a controller to control operations of the apparatus. The apparatus includes a transceiver module on the dispenser, wherein transceiver module includes a memory and a RF transceiver. A replaceable bulk storage container includes a box transponder whereby a wireless communication link is established between the box transponder and the transceiver module when the bulk storage container is within the storage compartment.

2 Claims, 5 Drawing Sheets

U.S. PATENT DOCUMENTS

| | | |
|---|---|---|
| 5,950,448 A | 9/1999 | Barnes et al. .................. 62/390 |
| 5,967,226 A | 10/1999 | Choi ........................... 165/63 |
| 6,082,123 A | 7/2000 | Johnson ........................ 62/136 |
| 6,325,244 B2 * | 12/2001 | Vincent et al. ................ 222/1 |
| 6,327,576 B1 * | 12/2001 | Ogasawara ................. 705/22 |
| 6,347,723 B1 * | 2/2002 | Barlian et al. ................. 222/1 |
| 6,564,999 B1 * | 5/2003 | Saveliev et al. ............ 235/383 |
| 6,698,619 B2 * | 3/2004 | Wertenberger ............... 222/94 |
| 6,705,106 B1 * | 3/2004 | Cunha et al. .................. 62/342 |
| 6,751,525 B1 * | 6/2004 | Crisp, III .................... 700/241 |
| 6,799,085 B1 * | 9/2004 | Crisp, III .................... 700/236 |

FOREIGN PATENT DOCUMENTS

| | | |
|---|---|---|
| GB | 2287306 A | 9/1995 |

\* cited by examiner

METHOD AND APPARATUS TO CONTROL A BEVERAGE OR DESSERT DISPENSER

CROSS-REFERENCE TO RELATED APPLICATIONS

This application is a continuation-in-part of U.S. patent application Ser. No. 10/261,846 filed Sep. 30, 2002, now U.S. Pat. No. 6,705,106 entitled SEMI-FROZEN BEVERAGE DISPENSING APPARATUS and is hereby incorporated by reference.

BACKGROUND OF THE INVENTION

1. Field of the Invention

The present invention is directed to a method and apparatus to control a liquid or semi-frozen liquid beverage or dessert dispenser. In particular, the present invention is directed to a method to control and operate a beverage or dispenser apparatus through communication between a liquid bulk storage container and the beverage or dessert dispenser apparatus.

2. Prior Art

There are a number of known beverage or dessert dispensers that include a liquid storage compartment and an onboard dispenser microcontroller which controls various functions and operating parameters of the dispenser. These devices dispense hot, chilled, or semi-frozen liquid beverages or desserts such as juice, coffee, slush and "soft-serve" desserts.

For semi-frozen beverages, the consistency is a thick slush that stands up in a cup or container. The solids content (sometimes described as "brix") may be maintained by operation of the dispenser. In one known arrangement, a hollow stainless steel cylinder is arranged horizontally in a bowl. A helical blade driven by an electric motor continually moves across the external portion of the cylinder to scrape off or "harvest" frozen crystals formed by the refrigeration process. Accordingly, over time, the entire contents of the bowl becomes semi-frozen and the product is mixed while in the bowl. One such apparatus is described in Applicant's co-pending U.S. patent application, Ser. No. 10/261,846 entitled "Semi-Frozen Beverage Dispensing Apparatus", which is incorporated herein by reference.

Liquid product to replenish the supply in the bowl may be provided from a bulk storage container. In one type of bulk packaging, a flexible inner storage membrane, such as plastic, is retained within a rigid package such as a cardboard or corrugated box. The liquid product travels from the storage container to the bowl of the dispenser via a fluid passageway tube.

Currently, it is not unusual for product manufacturers to place beverage or dessert dispensers in retail locations contingent upon the retailer using authorized products. Some of the current methods used to insure compliance include a written placement contract, periodic field inspections of the retail location, and proprietary connectors between the product storage container and the dispenser. The written placement contracts are costly and time consuming to enforce, field inspections are costly and time consuming, and proprietary connectors can be manipulated. Other compliance methods are similarly costly, time consuming or unreliable.

There remains a need to provide a system to assure that a product manufacturer's product specifications and particular products are utilized with a particular dispenser.

Existing beverage and dessert liquid mixes have different formulas for different flavors and different products. For example, a fruit based product will be different from a dairy based product. The liquid concentrate may be mixed with water in different rates depending on the product. Alternatively, some mixes are ready to use as they come from the storage container and no water is added. Various mixes may also tend to react differently when placed in a similar or same dispenser. The liquid product manufacturer is now reliant on an on-site operator to make any necessary adjustments such as the torque setting (resistance of the helical blade to movement), the mix ratio of the water to the concentrate, and to perform necessary cleaning and maintenance of the equipment. The liquid product manufacturer is also reliant on the vigilance of the retail operator to verify that the product is within code and has not expired.

It would be desirable to provide a system wherein the beverage or dessert dispenser will automatically adjust to the particular product being used based on the particular contents of liquid bulk storage container connected to the beverage or dessert dispenser.

It would also be desirable to provide a beverage or dessert dispenser that automatically adjusted mix ratios of product to water, temperature and other parameters in response.

It is also not unusual for a liquid product manufacturer to require a certain amount of usage by a retailer or retailers in order to justify placing or retaining a dispenser at the retail location. A current method to verify usage is to track purchases through a distribution channel. This can be cumbersome and ineffective because of multiple layers of distribution and because of a lack of accurate reporting of the same.

It would be desirable to have a system and procedure which could simply and automatically determine the amount of beverage or dessert usage from a particular dispenser machine at a particular retail location.

It would also be desirable to control operation of a beverage or dessert dispensing apparatus through operating control parameters supplied by a bulk storage container which parameters include out-of-date product parameters, authorization recognition parameters, initial freeze set point parameters for the product, desired concentrate ratio of the mix parameters, torque set point parameters to control refrigeration of the product, and required cleaning cycle parameters for the dispenser machine.

Finally, attempts have been made in the past to establish a wireless link between a fluid supply container and a machine. For example, see Wheeler et al., U.S. Pat. No. 6,467,888 entitled "Intelligent Fluid Delivery System For A Fluid Jet Printing System", wherein RFID communication between an ink container and an inkjet printer is established.

There remains a need to provide two-way communication between a liquid supply container and a dispenser machine. There also remains a need to provide a wireless communication system which interfaces with an existing microcontroller on a beverage or dessert dispenser.

It would also be desirable to establish a wireless communication link providing two-way communication between a liquid bulk storage container and a beverage or dessert dispenser.

SUMMARY OF THE INVENTION

The present invention is directed to a liquid or semi-frozen liquid beverage or dessert dispenser apparatus and a method and apparatus to control a beverage or dessert dispenser. One embodiment of the invention pertains to a semi-frozen liquid beverage dispensing apparatus. The dispenser includes a utility compartment having a main microcontroller which controls operation of the dispenser. The microcontroller includes a motherboard connected to a number of inputs and outputs for various devices and sensors such as a liquid level sensor and a temperature probe. The microcontroller executes a control program to control operations of the dispenser. An operator control interface interfaces with the microcontroller and is used in connection with operating the dispenser. The dispenser may include a number of visual displays for advertising and/or information about the product or products.

In the present invention, the dispenser includes a pair of bowls for dispensing of semi-frozen liquid beverages. Each bowl includes a lever which controls an opening in the bowl in order to dispense the semi-frozen liquid beverage.

The dispenser includes at least one integrated mix storage compartment area such as a refrigerated storage cavity having a door on hinges. In the present embodiment, the storage cavity receives a pair of bulk storage containers. Each container holds a supply of a desired product mix which will be mixed with water and cooled in the bowl.

A fluid passageway extends between the bulk storage container or containers and the bowl. A pump is utilized to transport liquid from the bulk storage container through the fluid passageway and into the proper bowl. A clock and a timer track the times of fluid delivery and thereby gives an indication of the volume of delivery.

A sensor is capable of sensing liquid level of the semi-frozen beverage in the bowl with the sensor, in turn, connected to the pump. When the liquid level is below the sensor, the pump would be activated in order to deliver fresh fluid into the bowl.

The dispenser includes a transceiver module having a memory and an RF transceiver. The transceiver module is in communication with a transceiver antenna located in the storage cavity between the two storage containers. When multiple storage containers are placed in the storage cavity, the communication system is capable of determining orientation and location of the individual containers by left or ride side and thereby identify the particular container.

The transceiver control module is interfaced by a wired serial connection with the dispenser main microcontroller.

The dispenser may also include a card transceiver antenna and a card receptacle. Information stored in the dispenser memory of the microcontroller may be copied to an external transponder, such as a smart card, by bringing the card in proximity to the card transceiver antenna. The smart card may take the form of a number of transponders sandwiched between substrate to form a card.

Each storage container includes a flexible plastic membrane bag which stores a liquid concentrate used to produce the particular product. The membrane bag is in fluid communication with a nipple or fitment which will be connected to the fluid passageway. The membrane bag is retained within a rigid package such as a cardboard or corrugated box. An RFD tag or box transponder is secured to the box and may also be accompanied by a printed label containing information such as product name and nutritional information. The present invention provides a method to communicate between the bulk storage container and the beverage dispenser. The system can ascertain that a storage container has been inserted into the storage cavity of the dispenser. In addition to unauthorized bulk storage container discrimination, the invention can identify the particular fluid media contained in the storage container and then report and log the same information to the dispenser controller. This allows the dispenser controller to set selected fluid media parameters, thereby optimizing performance of the dispenser to the particular specifications of the fluid media. Additionally, based on information from the storage container, the dispenser controller assigns a life cycle based on effective yield. That yield is monitored through equivalent run time of the pump. When the calculated volume in the container has expired, the transponder will be disabled preventing use of an expired container filled with unauthorized fluid media.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
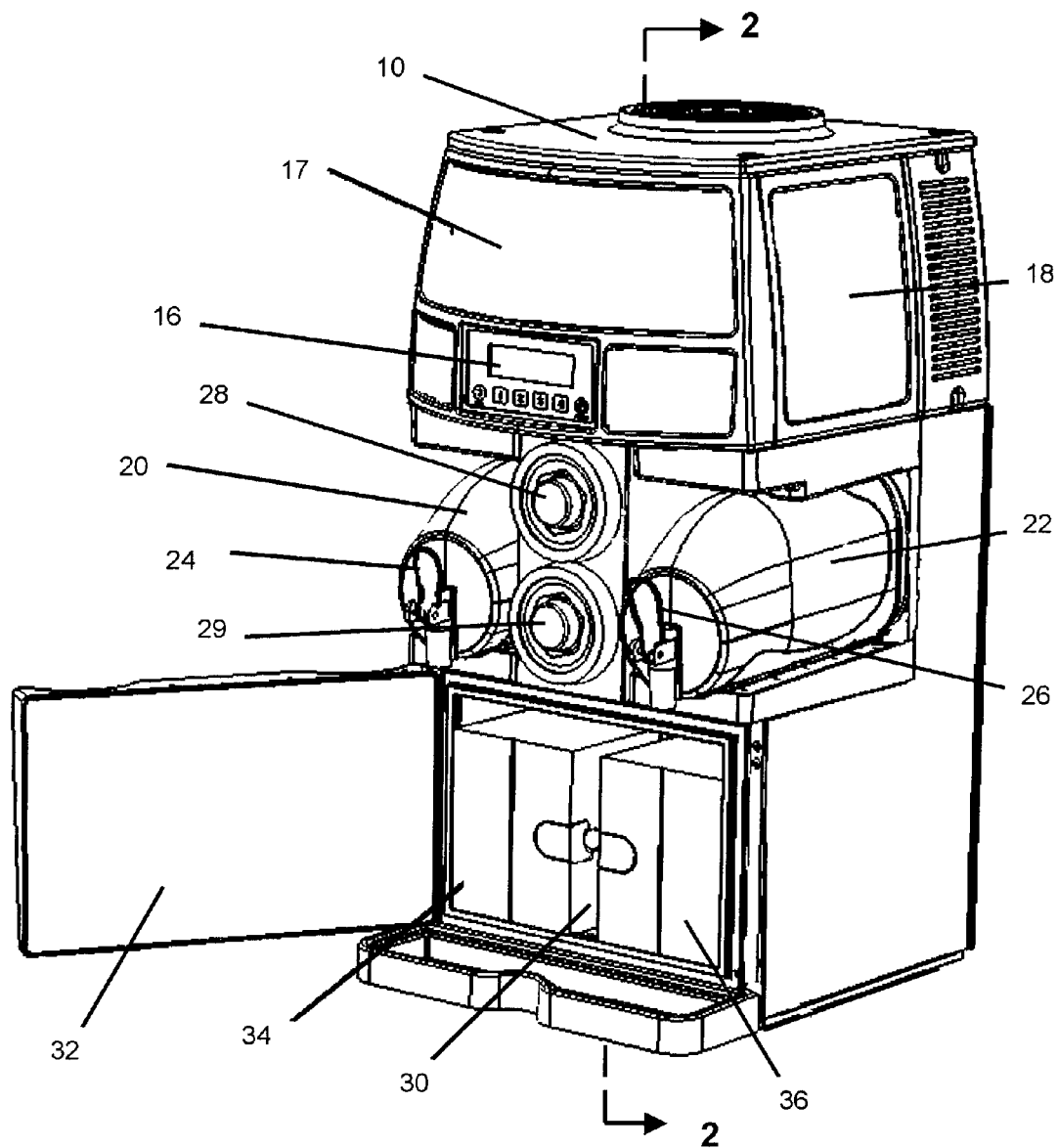
FIG. 1 is a perspective view of a beverage or dessert dispenser constructed in accordance with the present invention.

Referring to the drawings in detail, FIG. 1 illustrates a perspective view of a semi-frozen liquid beverage dispensing apparatus 10 constructed in accordance with the present invention. While one preferred embodiment of the present invention is utilized with a semi-frozen beverage dispenser, it will be understood that the teachings of the present invention may be employed with a wide variety of devices including liquid, beverage and dessert products.

The dispenser 10 includes a utility compartment 12 having a main microcontroller 13 (not visible in FIG. 1) which controls operation of the dispenser. The microcontroller 13 will have a computer motherboard will have a number of inputs and outputs for various devices to be described, such as a liquid level sensor and a temperature probe. A microprocessor computer chip on the motherboard will execute a control program while a memory on the motherboard is capable of storing the data and text. The control program runs on the microprocessor chip in order to control operations of the dispenser. Optionally, a further "daughterboard" may have additional inputs and outputs. Finally, a motor driver board may be utilized to control a pump or pumps in order to receive feedback concerning the speed of the pumps.

An operator control interface panel 16 interfaces with the microcontroller and is used in connection with operating the dispenser.

The dispenser 10 may include various displays 17 and 18 for advertising and/or information about the product or products. The displays may optionally be illuminated.

The dispenser 10 will include at least one bowl, and in the present embodiment, a pair of bowls 20 and 22 for dispensing of the semi-frozen liquid beverages. Each bowl includes a lever 24 and 26, respectively, which controls an opening in the bowl in order to dispense the semi-frozen liquid beverage. Optional cup dispensers 29 and 30 are located between the bowls 20 and 22.

The dispenser 10 includes at least one integrated mix storage compartment area, such as a refrigerated storage cavity 30 having a door 32 on hinges, shown in the open position in FIG. 1 for ease of comprehension. In the present embodiment, the storage cavity 30 will receive a pair of bulk storage containers 34 and 36. The containers hold a supply of a desired product mix, which may be mixed with water (depending on the particular product mix) and cooled in the bowl. The refrigerated storage cavity 30 retains the liquid beverage product in refrigerated but not frozen conditions.

Figure 2:
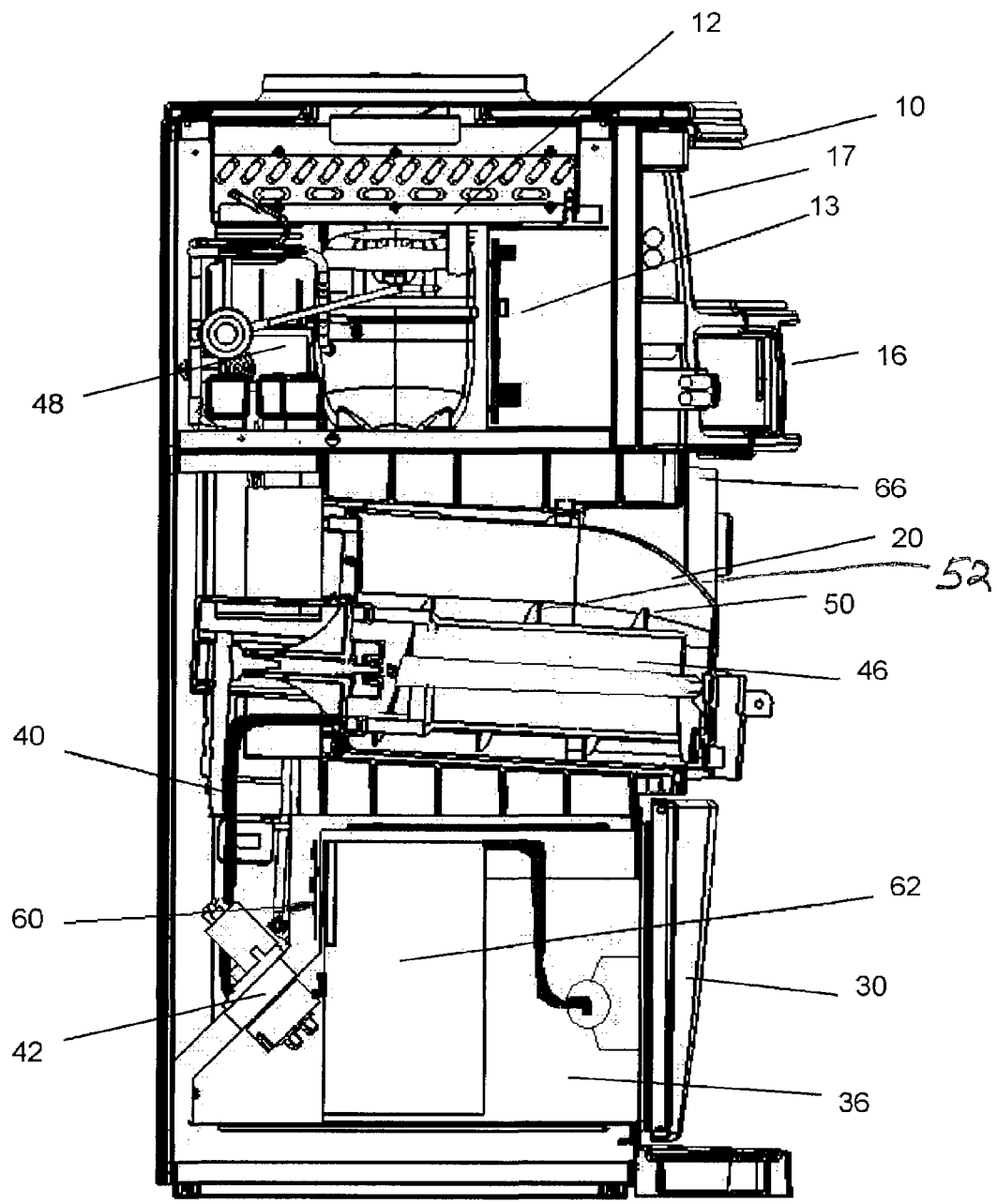
FIG. 2 is a sectional view taken along section line 2—2 of FIG. 1.

FIG. 2 is a sectional view of the dispenser 10 taken along section line 2—2 of FIG. 1. The utility compartment 12 includes a main microcontroller 13 as previously described. One bowl 20 is visible. A fluid passageway 40 extends between the bulk storage container or containers and the bowl 20. A pump 42 is utilized to force and transport liquid from the bulk storage container 34 or 36 through the fluid passageway 40 and into the proper bowl 20 or 22. A clock and a timer (not visible) tracks the times of fluid delivery and thereby gives an indication of the volume of delivery.

An optional sensor (not shown) would be capable of sensing liquid level of the semi-frozen beverage in the bowl 20 or 22 with the sensor connected to the pump. When the liquid level is below the sensor, the pump 40 would be activated in order to deliver fresh fluid into the bowl.

A stainless steel cylindrical evaporator 46 extends or projects horizontally into each of the bowls 20 and 22. A compressor located above the bowls in refrigeration assembly 48 is utilized to cool the cylindrical evaporator and, in turn, to decrease the temperature of the beverage in the bowl. In the present embodiment, a single compressor is used to refrigerate both of the bowls 20 and 22.

An external helical auger blade 50 surrounds and rotates about the exterior of the cylindrical evaporator 46 in order to scrape the semi-frozen beverage therefrom. The helical auger blade 52 is coaxial with the cylinder.

The dispenser 10 includes a transceiver module 60 having a memory and an RF transceiver. The transceiver module is in communication with a transceiver antenna 62. In the present embodiment, the antenna is located in the storage cavity 30 between the two containers 34 and 36. When multiple storage containers are placed in the cavity, the communication system will be capable of determining orientation and location of the individual containers by left or right side.

The transceiver control module 60 is interfaced by a wired serial connection with the dispenser main microcontroller 13.

The dispenser 10 may also include a card transceiver antenna 66 and a card receptacle.

Figure 3:
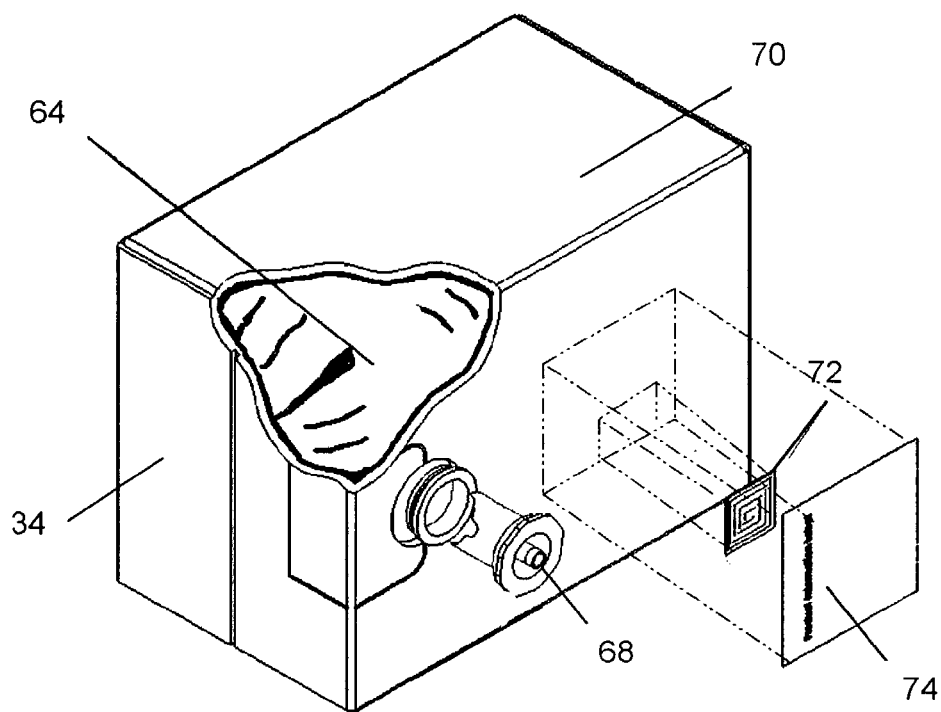
FIG. 3 is a partially exploded, perspective view of a liquid storage container utilized with the beverage dispenser of the present invention.

FIG. 3 is a perspective view of one bulk storage container 34 apart from the apparatus with portions cut away and portions exploded for clarity and comprehension.

The storage container 34 includes a flexible plastic membrane bag 64 which stores a liquid concentrate used to produce the particular product. The membrane bag 64 is in fluid communication with a nipple or fitment 68 which will be connected to the fluid passageway 40 (shown in FIG. 2). The membrane bag 64 is retained within a rigid package, such as a cardboard or corrugated box 70.

An RFID tag or box transponder 72 is secured to the box 70 and may be accompanied by a label 74 containing information such as product name and nutritional information.

Figure 4:
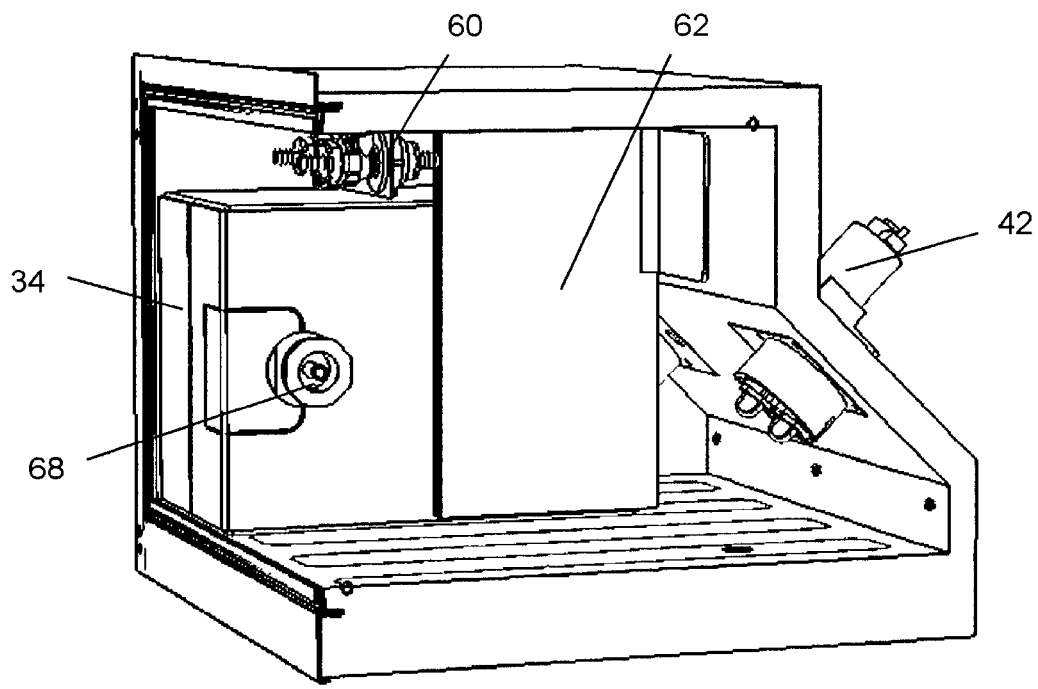
FIG. 4 is a partially cut-away view of a storage compartment having a storage cavity to receive liquid storage containers such as shown in FIG. 3.

FIG. 4 is a partial sectional view of the storage cavity 30 apart from the dispenser device 10. The storage cavity 30 has been partially cut away for clarity and ease of comprehension. The transceiver module 60 in communication with the antenna 62 is visible. One storage container 34 is within the storage cavity.

The present invention is also directed toward a method to communicate between a bulk storage container and the dessert or beverage dispenser 10. Although described with reference to embodiments wherein the dispenser is a slush dispenser, the invention is not so limited.

The method to communicate provides a detection mechanism so that it can be ascertained with near certainty that a storage container inserted into a dispenser 10 is an authorized container. The system provides an improved delivery system that communicates information between the container and the dispenser controller.

In addition to unauthorized bulk storage container discrimination, the system can identify the fluid media contained in the storage container and report and log same to the dispenser controller. This allows the dispenser to set selected fluid media parameters, thereby optimizing the performance of the dispenser to the particular specifications of the fluid media.

The system improves the ability to insure quality finished product from the beverage dispenser consistently. This can be accomplished by identifying unauthorized product and preventing its use and or alarming and logging the condition. The detection and logging of such conditions allows for documented enforcement of warranty, service and placement agreements.

Based on information from the storage container, the dispenser controller assigns a life cycle based on effective yield. That yield is monitored through equivalent pump run time. When the calculated volume in the container has expired, the transponder is disabled. This prevents the use of an expired container filled with unauthorized fluid media. Based on information from the container about the manufactured date and the expire date, the dispenser controller can monitor, notify and/or prevent the use of expired fluid media.

Also, based on information from the storage container, the dispenser controller will adjust the proper ratio of water to fluid media (described as brix setting) and set the optimum initial fluid media temperature to be achieved by the beverage dispenser 10.

The system includes an antenna in the mix storage compartment connected to an RF transceiver. When a storage container 34 or 36 is inserted into the mix storage compartment cavity 30, in close proximity to the transceiver antenna 62, the transceiver interrogates the RF transponder attached to the container. Information is passed from the transponder to the mix storage compartment transceiver and then to the dispenser controller. This information is processed and stored to be later downloaded through the system.

The system also includes a card transceiver antenna 66 placed in close proximity to an external surface of the dispenser. An independent smart data card that has one or more transponders imbedded. The smart card transponders will have read/write capabilities. When an authorized card is placed in close proximity to the external surface transceiver antenna, the RF transceiver downloads or uploads information based on the instruction set. Such information may include, but not be limited to, the number of containers used in a certain time period, the type of fluid media, alarm notifications, cleaning compliance and component run time and performance.

Figure 5:
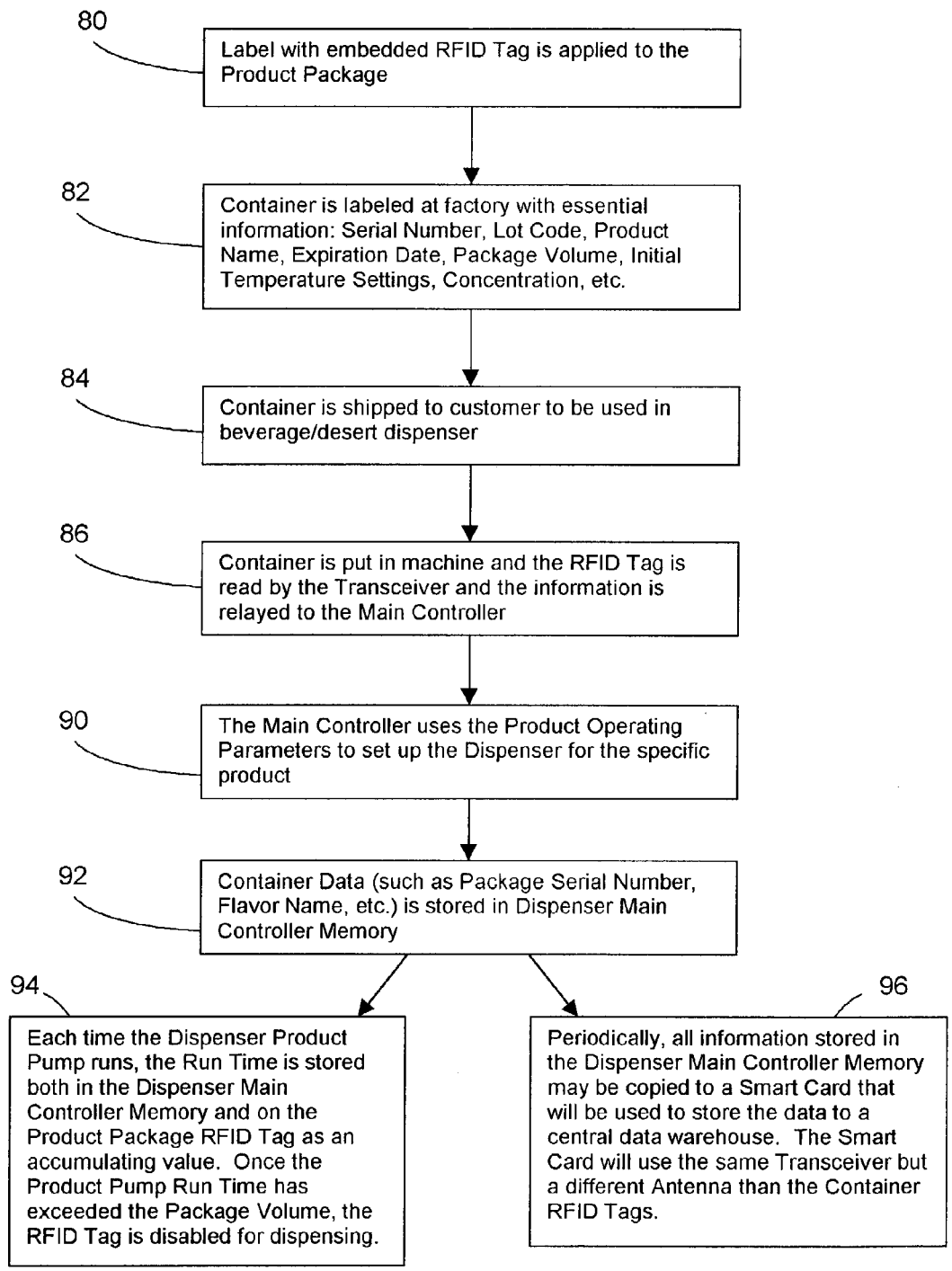
FIGS. 5 and 6 are flowcharts showing operation of the present invention.

FIG. 5 illustrates a flow chart of the information life cycle and operation of the present invention. As shown in box 80, a label with an imbedded RFID tag or box transponder 72 is applied to the storage container such as storage container 34 or 36 during manufacture. Thereafter, as shown in box 82, the storage container with product contained therein is labeled with a label. The imbedded box transponder includes essential information such as the serial number, the lot code, the product name, the expiration date, the package volume, and the initial temperature settings (the set point).

Thereafter, the storage container, such as container 34, with product therein is shipped to a customer by customary distribution channels to a retail location to be used in a particular beverage or dessert dispenser.

As seen in box 86, the storage container is inserted into the storage cavity 30 of a dispenser. The transceiver module through its antenna emits a wireless signal and the RFID tag or box transponder 72 is read by the transceiver module. The information is relayed to the main microcontroller 13 of the dispenser. As seen at box 88, the main controller 13 thereby uses the product operating parameters in order to set up the beverage dispenser for the use of the specific liquid product. The data concerning the product package, such as the serial number, lot code, product name, warranty data, placement agreements and such, is stored in the main controller 13 memory.

As shown at box 94, each time the dispenser pump runs, the run time is stored in the main microcontroller memory and also with the RFID tag or transponder 72 as an accumulating value. Once the established product pump run time has exceeded the set volume, the RFID tag is disabled to prohibit any further dispensing with that storage container. The pump will not, therefore, run.

Additionally, as shown at box 96, periodically, all information stored in the dispenser memory of the microcontroller 13 may be copied to an external transponder, such as a smart card by bringing the card in proximity to the card transceiver antenna. The smart card may take the form of a number of transponders sandwiched between substrates. The smart card may use the same transceiver and have a separate antenna 66.

Figure 6:
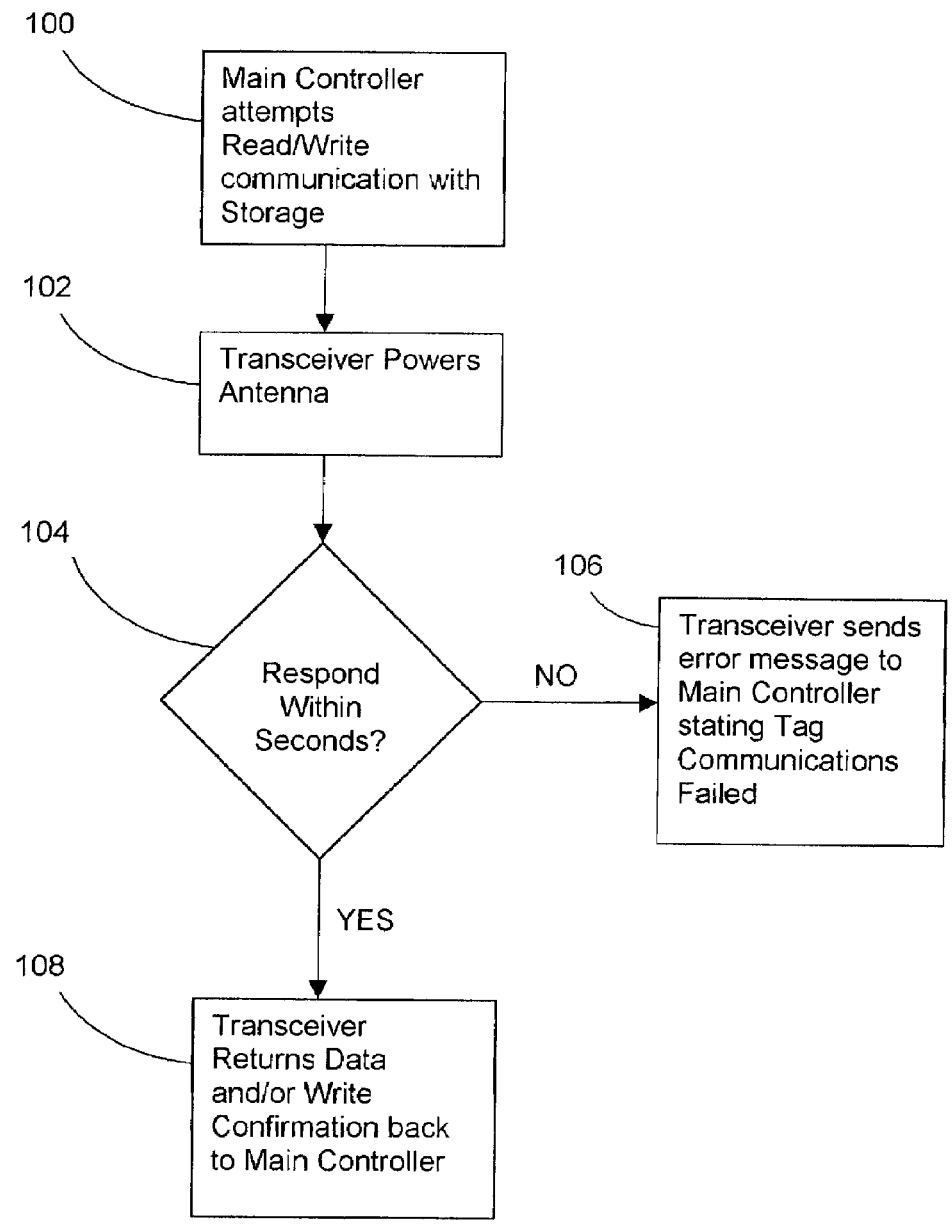

FIG. 6 illustrates a simplified flowchart of the control flow during an initial query and communication between the storage container and the beverage dispenser. As shown at box 100, the main microcontroller 13, through the transceiver module 60 attempts read/write communication with the box transponder 72 on the storage container. This may be described as interrogating the box transponder. As seen at box 102, the transceiver module 60 in addition to communication powers the storage box transponder 72. As shown by diamond 104, if a response is received from the transponder within x number of seconds, the transceiver module 60 returns data and/or write confirmation back to the main controller as set forth in box 108. If a response is not received within the time period (see box 106), the transceiver module 60 sends an error message to the microcontroller 13 stating that communication with the box transponder and storage container failed. When the transceiver interrogates the box transponder and finds a parameter that is unacceptable, then a preset of instructions on the main microcontroller 13 disables delivery of fluid from that container. One way this is done is to shut down the pump, therefore, no further product is pumped from the storage container to the bowl. It is also possible to display an error message on the interface panel 16 so that an operator will be alerted.

Whereas, the present invention has been described in relation to the drawings attached hereto, it should be understood that other and further modifications, apart from those shown or suggested herein, may be made within the spirit and scope of this invention.

What is claimed is:

1. A liquid or semi-frozen liquid beverage or dessert dispenser apparatus having a storage compartment for a liquid bulk storage container and having a controller to control operations of said apparatus, which apparatus comprises:
   a. a transceiver module having a memory and a RF transceiver, said module located on said dispenser; and
   b. at least one replaceable bulk storage container having a box transponder, whereby a wireless communication link is established between said box transponder and said transceiver module when said bulk storage container is within said storage compartment, wherein said storage compartment receives two said bulk storage containers and said transceiver module is located therebetween.

2. A liquid or semi-frozen liquid beverage or dessert dispenser apparatus as set forth in claim 1 wherein said bulk storage containers each include a flexible membrane bag including a fluid connection nipple within a rigid package and including a communication and control mechanism providing communication between said controller and said transceiver module to set and control multiple fluid media parameters of fluid media.

* * * * *